June 5, 1928.
A. J. GORLICK
1,672,254
LIQUID VENDING APPARATUS
Filed Sept. 2, 1926   3 Sheets-Sheet 1
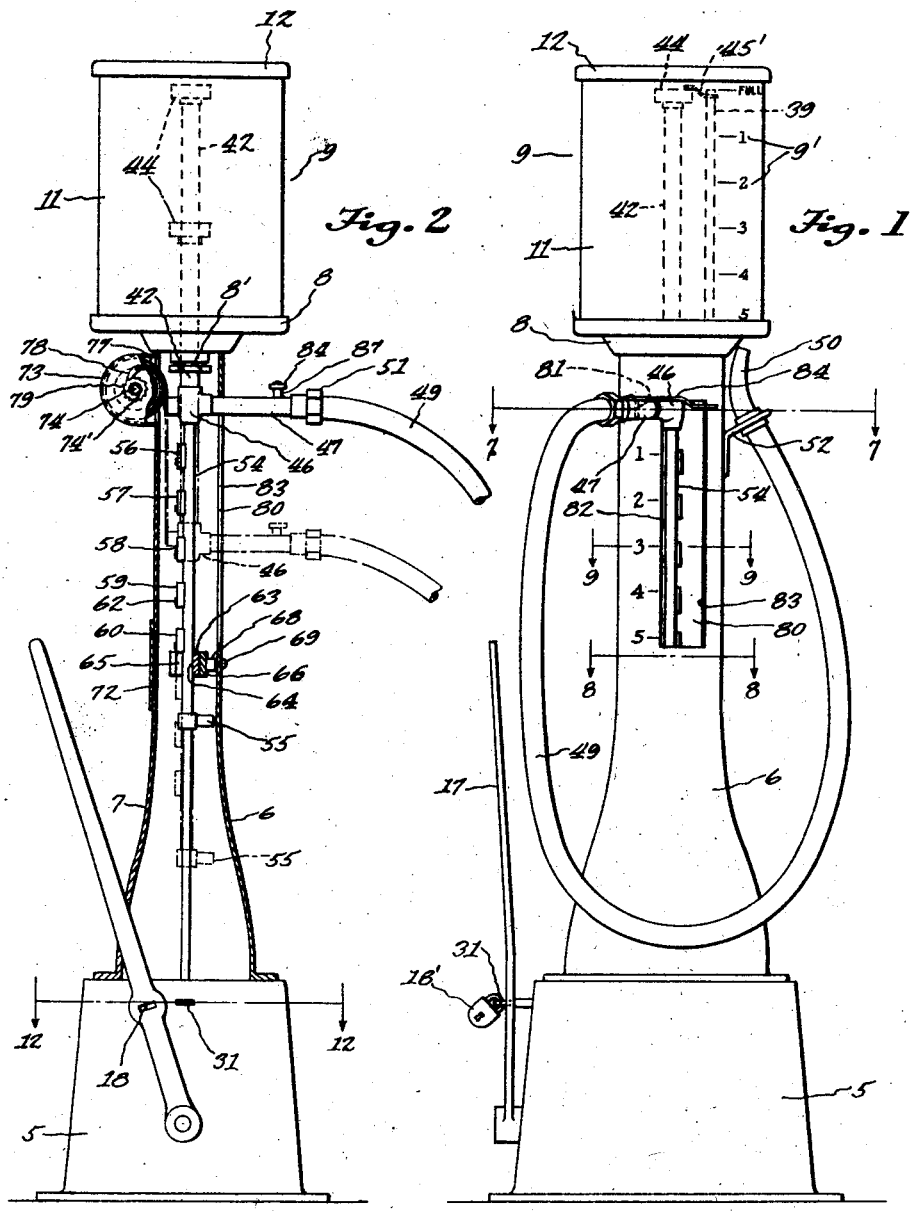
Inventor
Andrew J. Gorlick
By John A. Bornhardt
Atty

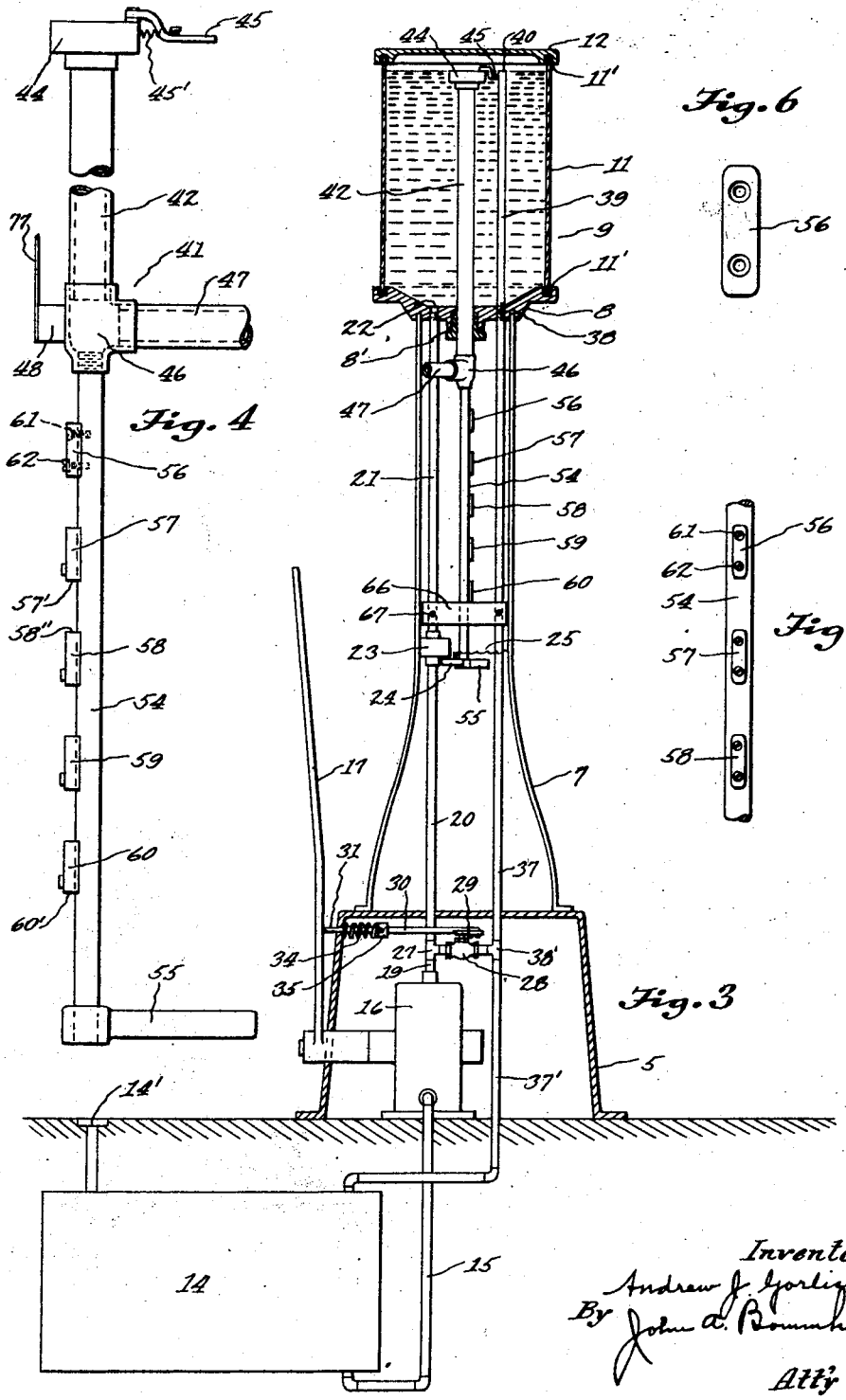

June 5, 1928.  
A. J. GORLICK  
1,672,254  
LIQUID VENDING APPARATUS  
Filed Sept. 2, 1926     3 Sheets-Sheet 3

Inventor  
Andrew J. Gorlick  
By John A. Bommhardt  
Atty

Patented June 5, 1928.

1,672,254

UNITED STATES PATENT OFFICE.

ANDREW J. GORLICK, OF CLEVELAND, OHIO.

LIQUID-VENDING APPARATUS.

Application filed September 2, 1926. Serial No. 133,193.

This invention relates to new and useful improvements in liquid storage and vending systems and more particularly liquid or gasoline measuring and dispensing apparatus of the general type having an elevated visible container, with filling means, dispensing the measured liquid by gravity.

An object of the invention is to provide improved means designed to measure and dispense a full predetermined measured amount of liquid from the container with visible contents, preventing divertment of any part of the measured amount such as returning part thereof into the storage tank or in any manner delivering less than the amount of liquid measured.

Another object of the invention is to provide improved means for preventing withdrawal, through the measuring and dispensing apparatus, of liquid from the storage tank when the apparatus is not in use.

Another object is to provide improved counterbalancing means for the apparatus facilitating the operation thereof.

Other objects and features of the invention will be hereinafter pointed out and described.

In the drawings:

Fig. 1 is a front elevation of the liquid measuring and dispensing apparatus.

Fig. 2 is a side elevation thereof partly in section.

Fig. 3 is a vertical sectional view.

Fig. 4 is an enlarged detail view of the liquid measuring outlet.

Fig. 5 is fragmentary view showing the measuring lugs on the outlet rod.

Fig. 6 is an enlarged detail view of a measuring lug.

Figure 7:
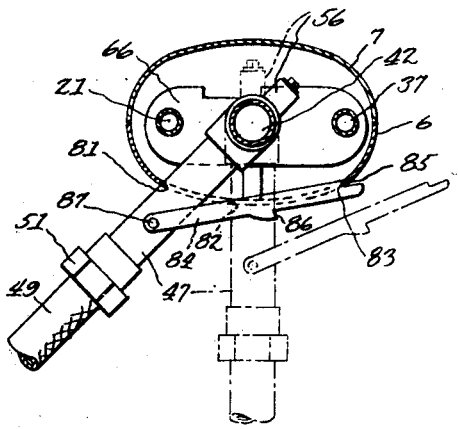
Fig. 7 is a sectional view on line 7—7 of Fig. 1 showing the normal container filling position of the liquid outlet.

Referring specifically to the drawings, 5 indicates the base of the dispensing apparatus having mounted thereon front and rear casings 6 and 7 secured together, the casings supporting the bottom 8 of the liquid or gasoline container 9 having a cylindrical glass wall 11 gasketed as at 11' and top closure 12 suitably secured to bottom 8. A liquid or gasoline storage tank 14, having a filling pipe 14' is connected at the bottom thereof by pipe 15 to a suitable gasoline pump 16 disposed within base 5, the pump shaft projecting through the base 5 having a rocker lever 17 thereon provided with a locking slot 18. The pump 16 is connected to the container 9 for filling with gasoline by pipes 19, 20, and 21, the pipe 21 threading into the bottom of bottom 8 as at 22. A suitable valve 23 preferably of the swinging gate type connects pipes 20 and 21. The valve 23 has an actuating lever 24 connected to a helical spring 25 connected as at 26 to front casing 6. Spring 25 normally holds valve 23 closed.

Pipes 19 and 20 are connected by a T 27 connected to a suitable normally closed valve 28 connecting to a T 38' in overflow pipes 37 and 37', the pipe 37' connecting to the top of storage tank 14. The overflow pipe 37 is threaded into a tapped hole 38 in container bottom 8. Another overflow pipe 39 in container 9 is threaded into bottom tap 38, the upper open pipe end 40 extending to near the container top.

The liquid container dispensing outlet 41 comprises tube 42 extending through a central packing gland 8' in container bottom 8, the upper end of tube 42 extending into container 9 having a suitable self closing valve 44 thereon such as a sliding gate valve, with an actuating lever 45 having a closing spring 45'. The lower end of tube 42 projecting between casings 6 and 7 is screw threaded into a T 46 having a branch outlet tube 47 screw threaded therein and extending through an opening 80 in front casing 6. A rubber fabric hose 49 having a nozzle 50 is connected to tube 47 by coupling 51, the nozzle resting when not in use on a yoke 52 secured on the side of casing 6 near the top thereof.

A measuring rod 54 is screw threaded into the reduced bottom of T 46 and pinned, the bottom end of the rod carrying a curved lever 55 for purposes to be hereinafter described. A plurality of spaced rectangular shaped measuring lugs 56, 57, 58, 59 and 60 are aligned and mounted on rod 54, oppositely to tube 47, by countersunk head screws 61 and 62, the heads of the lower screws 62 projecting slightly. The lugs of equal length are equally spaced from the bottom of T 46, the length of each lug equalling the spaces between. The lugs are slightly rounded at the corners thereof.

The rod 54 extends through the opening 64 of a collar 63, the thickness thereof equalling the width of the spaces between lugs 56, 57, 58, 59 and 60. The collar 63, having a rearward slot 65, is securely mounted in a block 66 having pipes 21 and 37 extending therethrough and set screwed as at 67. The block 66 is secured to front casing 6 by spacing block 68 and bolts 69, preventing vertical displacement of block 66 and collar 63.

A measure or gallon counter 70, mounted on the rear of block 66, has a spring actuating arm 71 adapted to be engaged by the heads of lug screws 62. A covered opening 72 of casing 7 provides access to the counter 70.

Means for counterbalancing the dispensing outlet comprises a box 73, mounted on the rear casing 7, having a shaft 74 on which is carried by bearings a drum 75 within box 73 the drum containing a spiral spring 76 having one end secured to drum 75 and the other end to shaft 74. The drum 75 has a tape 77 secured and wound thereon with the outer end secured to a block 48 mounted on the back of T 46. The spring 76 is wound to obtain a desirable tension by turning the squared end 74' of shaft 74 maintained by a pawl 78 on casing 73 engaging ratchet wheel 79 on shaft 74.

The opening 80 in front casing 6 is provided with adjacent measure indicating numerals 80'.

Figure 8:
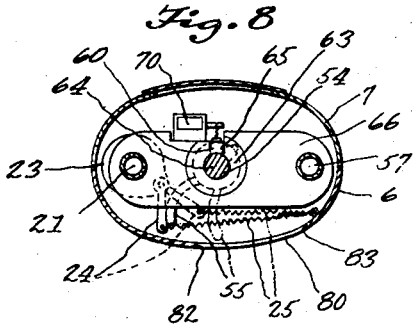
Fig. 8 is a section on line 8—8 of Fig. 1 showing the position of the container inlet valve and measuring rod actuating lever, corresponding to the position of the outlet in Fig. 7.
Figure 10:
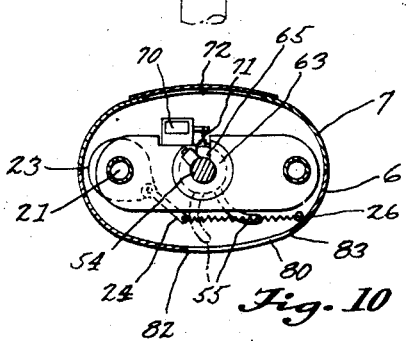
Fig. 10 is a view similar to Fig. 8 showing the valve and lever positions corresponding to Fig. 9.
Figure 12:
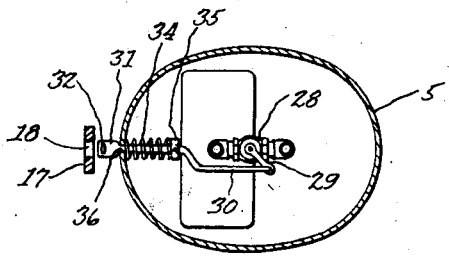
Fig. 12 is a section on line 12—12 of Fig. 2 showing the pump handle unlocked.
Figure 11:
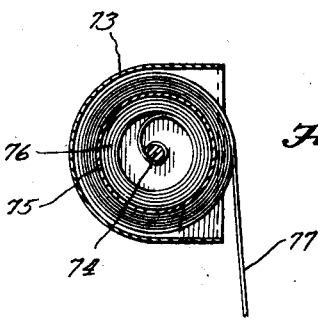
Fig. 11 is a detail section of the outlet counterbalancing means.

In operation of the measuring and dispensing apparatus, the outlet tube 47 is normally turned to the left, as shown in Figs. 1 and 7, against wall 81 of casing opening 80 and retained by latch 84 pivoted as at 87 on tube 47, the latch having a notch 85 engaging the opposite edge 83 of opening 80. The dispensing outlet 41 is normally supported by the bottom 60' of lug 60 setting on collar 63. As shown in Fig. 8 the arm 55 of rod 54 is in engagement with valve lever 24 holding the valve 23 open. The valve 44 is normally maintained closed by spring 45' on lever 45. Valve 28 is maintained closed during operation of the apparatus by the thrust of a compression spring 34 between base 5 and collar 35 pinned on rod 30 connected to valve lever 29, the outer flattened end 31 of rod 30 extending through an opening 36 in base 5.

The container is filled with gasoline by manually rocking the unlocked lever 17 of pump 16, pumping the gasoline from storage tank 14 through pipe 15, pump 16, pipe 19, T 27, pipe 20, valve 23, pipe 21 into the container 9. When the container 9 is filled and the gasoline starts to overflow into the top 40 of overflow pipe 39, the pumping is discontinued, the overflow gasoline passing through pipes 39, 37, T 38 and pipe 37' into the storage tank 14 again. The closed valve 28 and discontinued pump 16 prevent the gasoline in container 9 from flowing out through pipes 21 and 20 into the tank 14. The container 9 is adapted to hold a predetermined amount of gasoline, in this case five gallons, when the gasoline level is even with the open top 40 of overflow pipe 39.

When desirable to dispense gasoline to a customer, for example three gallons in amount, the hose nozzle is inserted into the tank of the customer's vehicle and the tube 47 after unlatching is grasped and turned straight forward as shown in dot and dash lines in Fig. 7, the rod lever 55 disengaging valve lever 24 allowing spring 25 to close valve 24 as shown in Fig. 8. The top valve 44 remains closed.

The forwardly extending tube 47 is then lowered to a position opposite to the three gallon indication on casing 6, the lugs 60, 59 and 58 sliding through collar slot 65, the straight edge 82 of opening 80 serving as a guide. The projecting screw heads 62 of lugs 58, 59, and 60 engage and strip the spring arm 71, of counter 70 adding three gallons to the previous total of gallons counted by the counter.

Figure 9:
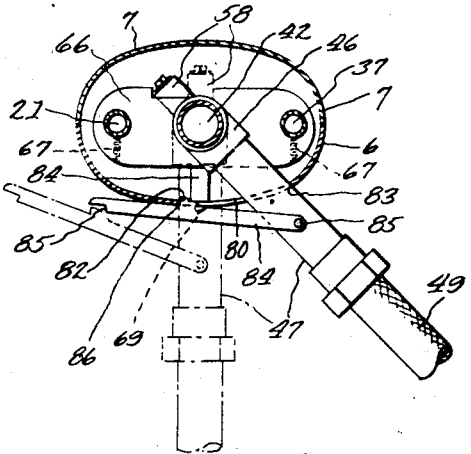
Fig. 9 is a sectional view on line 9—9 of Fig. 1 showing the liquid outlet in dispensing position in full lines and in neutral adjusting position in dot and dash lines.

The tube is then turned to the right against opening edge 83 as shown in Fig. 9 in full lines, and secured by the notch 86 of latch 84 engaging against opening edge 82, the bottom 57' of lug 57 riding over and setting on collar 63 and the top 58'' of lug 58 riding under the collar 63, preventing any vertical movement of rod 54 or valve 44. In moving to this position the lever arm 45 of valve 44 engages overflow pipes 39 opening the valve 44 through which the gasoline flows by gravity through tube 42, T 46, tube 47, hose 49, and nozzle 50 into the customer's tank. Valves 23 and 28 remain closed. The gasoline can only flow through the hose 49 out of container 9 when tube 47 is turned to the right against opening edge 83. In this position the rod 54 and valve 44 cannot be raised or lowered to vary the amount of gasoline being delivered to the customer, insuring the correct amount.

When the gasoline stops flowing and the full measured amount has run out through valve 44 into the customer's tank as indicated at the measure indications 9' on the glass wall 11 of container 9, the tube 47 is unlatched and turned to forward position as shown in dot and dash lines in Fig. 9, disengaging valve lever 45 from overflow pipe 39 allowing the spring 45' to close the valve. The tube 47 is then raised to the top edge of opening 80, the lugs 58, 59 and 60 passing through collar slot 65 and the valves 44 and 23 remaining closed. When fully raised the tube 47 is turned to the left again in initial position and latched as shown in full lines in Fig. 7, the rod arm 55 engaging valve arm 24 opening the valve 23 again, the valve 44 remaining closed. The container is now ready to be pumped full of gasoline again as hereinbefore described, for the next customer.

The tube 47 can be raised or lowered only when extending in forward position aligning the lugs 56, 57, 58, 59 and 60 with collar slot 65, to allow the lugs to pass through the collar slot 65. The spring 76 in drum 75 through connecting tape 77 counterbalances the weight of the measuring and outlet member 41.

To close or lock the measuring and dispensing apparatus especially at night for preventing withdrawal of gasoline from the storage tank the flattened end 31 of rod 30 is pulled through slot 18 of the vertically positioned rock lever 17 and secured by a lock 18' hooked in rod opening 32, compressing spring 34 between collar 35 and base 5, the rod 30 turning valve lever 27 opening valve 28. The pump is now locked preventing pumping of gasoline into container 9, and the gasoline left in the container 9 drains out through pipe 21, open valve 23 and pipe 37, back into the storage tank 14

While I have shown and described one embodiment of the invention, obviously various changes in the details of construction may be made within the scope and spirit of the appended claims.

I claim:

1. A dispensing apparatus comprising a supply tank, an elevated container, a supply pipe and an overflow pipe between said tank and said container, a pump connected to said supply pipe and having a handle, a connection between said supply pipe and said overflow pipe including a valve having a spring pressed rod for normally holding the same closed, said rod being engageable with said handle to lock the handle and hold the valve open.

2. The combination with an elevated container, of a rotatable and reciprocable dispensing pipe leading therefrom, and means to hold the said pipe in predetermined positions comprising a fixed collar, and lugs on the pipe adapted to respectively rest upon said collar when the pipe is adjusted to selected position.

3. A dispensing apparatus having an elevated container, a rotatable and reciprocable dispensing pipe leading from said container, said pipe having rigidly fixed thereto a rod, said rod having a plurality of spaced lugs thereon, and a fixed supporting collar thru which the rod passes, said collar having a slot thru which the lugs may be passed, whereby the lugs may be positioned in engagement with said collar to support said pipe or passed thru said slot to allow reciprocation of said pipe 4. The dispensing apparatus as set forth in claim 3, the thickness of said collar being equal to the space between the lugs.

5. In a dispensing apparatus, a casing having an opening therein, a rotatable dispensing pipe extending thru said opening and adjustable therein, said pipe having a latch pivoted thereto and engageable with the sides of said opening to hold the pipe in adjusted position.

6. A dispensing apparatus having an elevated container, a supply pipe and an overflow pipe, a rotatable and vertically reciprocable dispensing pipe leading from said container, a valve in said supply pipe having means operatively connected to the dispensing pipe to open said valve when the dispensing pipe is rotated, said dispensing pipe having a valve provided with means engageable with said overflow pipe to open the said last named valve when the dispensing pipe is rotated.

7. In a dispensing apparatus having an elevated container, a combined supply and drain pipe communicating therewith, said pipe having a valve therein, said valve being normally closed, a measuring mechanism and means actuated by said mechanism to open said valve only when said mechanism is in the filling position, said filling position being also the draining position.

8. A dispensing apparatus as set forth in claim 7, said pipe also provided with a draining branch provided with a normally closed drain valve, and a pump locking device operatively connected to said drain valve to hold it in open position.

9. In a dispensing apparatus having an elevated container, a supply pipe and an overflow pipe, a rotatable vertically reciprocable dispensing pipe leading from said container, a valve at the top of said dispensing pipe, said valve being normally closed and means to open said valve by rotation of said dispensing pipe before said dispensing pipe is moved to a discharging position.

10. The dispensing apparatus as set forth in claim 9, together with a valve in said supply pipe, said last named valve arranged to be closed when said dispensing pipe is in a discharging position.

In testimony whereof, I do affix my signature.

ANDREW J. GORLICK.